US009095802B2

(12) United States Patent
McCarthy et al.

(10) Patent No.: US 9,095,802 B2
(45) Date of Patent: Aug. 4, 2015

(54) BIOSAFETY CABINETS WITH AIR FILTERS ACCESSIBLE THROUGH THE WORK CHAMBER

(75) Inventors: Larry A. McCarthy, Sanford, ME (US); Robert E. Lloyd, Kittery Point, ME (US); D. Aaron Johnson, Kennebunk, ME (US); Robert A. Thibeault, Sanford, ME (US); Martin S. Rogers, Saco, ME (US); Ronald W. Gingras, Sanford, ME (US); John Keith Campbell, Saint Charles, IL (US); Gene Klingbeil, Burnsville, MN (US)

(73) Assignee: THE BAKER COMPANY, Sanford, ME (US)

( * ) Notice: Subject to any disclaimer, the term of this patent is extended or adjusted under 35 U.S.C. 154(b) by 1717 days.

(21) Appl. No.: 12/009,977

(22) Filed: Jan. 23, 2008

(65) Prior Publication Data
US 2008/0278042 A1    Nov. 13, 2008

Related U.S. Application Data

(60) Provisional application No. 60/928,509, filed on May 10, 2007.

(51) Int. Cl.
*B08B 15/02* (2006.01)
*B01D 46/00* (2006.01)
*B01L 1/04* (2006.01)

(52) U.S. Cl.
CPC .............. *B01D 46/0091* (2013.01); *B01L 1/04* (2013.01); *B08B 15/02* (2013.01); *B01D 2265/04* (2013.01); *B01L 2200/082* (2013.01)

(58) Field of Classification Search
CPC ........................................................ B08B 15/02
USPC ........................................................ 454/57, 58
See application file for complete search history.

(56) References Cited

U.S. PATENT DOCUMENTS

| 3,874,754 | A | * | 4/1975 | Saunders et al. | 312/209 |
| 4,098,174 | A | * | 7/1978 | Landy | 454/57 |
| 4,548,627 | A | * | 10/1985 | Landy | 55/385.2 |
| 5,447,544 | A | * | 9/1995 | Birdwell | 96/423 |
| 5,843,196 | A | * | 12/1998 | Leavey et al. | 55/356 |
| 6,623,540 | B2 | * | 9/2003 | Clayton et al. | 55/480 |

* cited by examiner

*Primary Examiner* — Steven B McAllister
*Assistant Examiner* — Samantha Miller
(74) *Attorney, Agent, or Firm* — Sean D. Detweiler, Esq.; Morse, Barnes-Brown & Pendleton, P.C.

(57) ABSTRACT

A biosafety cabinet includes one or more air filters below the work surface and a system for holding, sealing, replacing and disposing the air filters through the work access opening of the biosafety cabinet. The air filters under the work surface of the biosafety cabinet capture particulates entering the cabinet from the exterior environment and the particulates within the cabinet's work chamber. Instead of a mechanical clamp, the perimeter of the air filters are sealed using a gasket and a tape, eliminating the accumulation of the contaminants around mechanical clamps. The air filters may be accessed through the work access opening of the biosafety cabinet, packaged for disposal and removed from the biosafety cabinet without being exposed to the exterior environment. A filter cover with an adhesive surface is used to cover and lift the used, contaminated air filter within the biosafety cabinet.

13 Claims, 16 Drawing Sheets

BIOSAFETY CABINETS WITH AIR FILTERS ACCESSIBLE THROUGH THE WORK CHAMBER

RELATED APPLICATION

This application claims priority to, and the benefit of, U.S. Provisional Application No. 60/928,509, filed May 10, 2007, for all subject matter common to both applications. The disclosure of said provisional application is hereby incorporated by reference herein in its entirety.

FIELD OF THE INVENTION

The present invention relates to biosafety cabinets, and more particularly a biosafety cabinet having one or more air filters below the work chamber, the air filters being removable and replaceable through the work chamber instead of through another exterior access panel.

BACKGROUND OF THE INVENTION

A biosafety cabinet is a ventilated cabinet that uses a variety of combinations of air filters, unidirectional air flow, and containment to provide personnel, product, and cross contamination against particulates or aerosols from bio-hazardous agents. Conventional biosafety cabinets include one or more High Efficiency Particulate Arresting (HEPA) filters, although other types of air filters may be used as well. A HEPA filter is a type of air filter that can remove at least 99.97% of airborne particles down to 0.3 micrometers ($\mu$m) in diameter.

Typically, biosafety cabinets have an opening allowing the user to gain physical access to a working area, workspace, or chamber within the cabinet. The user can close off the opening using a door, a panel, or the like, which is done for purposes of conducting experiments or some process within the cabinet that would emit hazardous byproducts or germicidal (ultraviolet) light. The door may include a sliding view screen, may be replaced by a sliding view screen, or may be of some other variation known to those of ordinary skill in the art. For purposes of consistency, the term "door" is used throughout the application to refer to all such variations. The door, panel, or the like, is often made of glass or some other substantially transparent material, and can form all or a portion of a substantially transparent panel referred to as a sliding view screen.

The biosafety cabinets may include one or more air filters below the work surface to capture the contaminated particulates in the air leaving the workspace area but before the particulates reach other areas of the biosafety cabinet including the cabinet blower and positive pressure plenums inside the biosafety cabinet. The conventional biosafety cabinets required the use of mechanical clamps, hardware and extruded gasket to seal the air filters to the biological safety cabinet, making it hard to clean around the sealing material. To keep a safe clean-air-level inside the biosafety cabinet, the air filters need to be replaced at certain intervals. The filters are replaced when the cabinet air flows can no longer be set to within ±5% feet-per-minute (FPM) of the nominal set point by adjusting the speed control and/or balancing damper. The filters are also replaced if they are damaged.

With the conventional biosafety cabinets, when removing the air filter, it is necessary to remove an exterior panel to gain access to the air filter. Before any seal panels are removed, the cabinet should be decontaminated. The filters collect microorganisms and other potentially harmful particles generated in the work area during their lifetime, and maintenance personnel should not be exposed to these microorganisms. Clothing and/or breathing apparatus may be required during the filter change to reduce the hazard. It is advisable to seal the contaminated side of the filter by taping a plastic sheet or cardboard over the face before removal. This should minimize the number of particles shaken loose from the filter. Once removed, the filter should immediately be sealed in a chemical hazard bag and then disposed of safely in accordance with environmental regulations. After filter replacement has been completed, the cabinet and the room should be cleaned and decontaminated in a manner consistent with the nature of the hazardous material. The cleaning materials, along with the protective gear and clothing should be properly disposed.

SUMMARY

In accordance with one embodiment of the present invention, a biological safety cabinet includes a housing formed of a plurality of walls defining a chamber having an internal environment inside the chamber. A door is disposed on one wall of the housing having an open position and a closed position. The door provides physical access to the workspace chamber and the work surface when in the open position and obstructs access to the chamber when in the closed position. A work surface forming a bottom of the workspace chamber is provided. The biological safety cabinet includes an air exhaust passage exiting from the workspace chamber. The air exhaust passage provides a pathway for air drawn through the workspace chamber and out of the workspace chamber. At least one air filter is disposed across the air exhaust passage. The air filter is adapted to filter air exiting from the workspace chamber through the air exhaust passage. The air filter is removable and replaceable through the work access opening of the workspace chamber.

The biological safety cabinet also includes a removable non-clamped seal around the perimeter of the air filter sealing the filter against the biological safety cabinet to prevent airflow from passing around the filter. The removable non-clamped seal is fixed to the biological safety cabinet using a gasket material applied to the perimeter of the at least one air filter and an adhesive tape applied on the gasket material. The adhesive tape prevents particulates in the air from attaching to the gasket material.

In accordance with aspects of the present invention, a method of removing an air filter from a biological safety cabinet includes providing the biological safety cabinet with a work access opening that gives physical access to a workspace chamber of the biological safety cabinet. The biological safety cabinet includes at least one air filter below the workspace chamber, the air filter beings sealed to the biological safety cabinet using a removable seal. The method also includes decontaminating the workspace chamber and accessing the workspace chamber through the work access opening of the biological safety cabinet. The at least one air filter is dismounted and removed through the work access opening.

Unmounting and removing the air filter includes removing a work surface provided at a bottom of the workspace chamber to expose the air filter. The adhesive tape is removed from a perimeter of the air filter. The gasket material is also removed from the perimeter of the air filter. A filter cover is pressed over the air filter. The surface of the filter cover facing the at least one air filter includes adhesive. The air filter is attached to the filter cover and the filter cover is lifted with the air filter. The filter cover and the air filter are placed in a hazardous material disposal container.

In accordance with aspects of the present invention, a method of placing an air filter in a biological safety cabinet includes providing the biological safety cabinet with a work access opening enabling physical access to a workspace chamber of the biological safety cabinet. The biological safety cabinet includes an air exhaust passage exiting from the workspace chamber providing a pathway for air drawn through the workspace chamber and out of the workspace chamber and at least one air filter housing below the workspace chamber. The workspace chamber is accessed through the work access opening. The air filter is passed through the work access opening and mounted in the air filter housing and across the air exhaust passage. The method further includes removing a work surface provided at a bottom of the workspace chamber. The air filter is placed in the at least one air filter housing, a protective screen of the air filter facing the workspace chamber. A gasket material is applied around a perimeter of the air filter. An adhesive tape is applied around the perimeter of the air filter, the adhesive tape covering the gasket material.

In accordance with various aspects of the present invention, a filter cover includes a first flat surface provided to fit over an air filter of a biological safety cabinet, wherein the first flat surface has adhesive applied thereto and one or more handles provided on a second flat surface of the filter cover, the second flat surface being provided opposite from the first flat surface. The surface area of the filter cover is equal to or larger than a surface area of the air filter.

BRIEF DESCRIPTION OF THE DRAWINGS

The present invention will become better understood with reference to the following description and accompanying drawings, wherein.

DETAILED DESCRIPTION

Figure 1A:
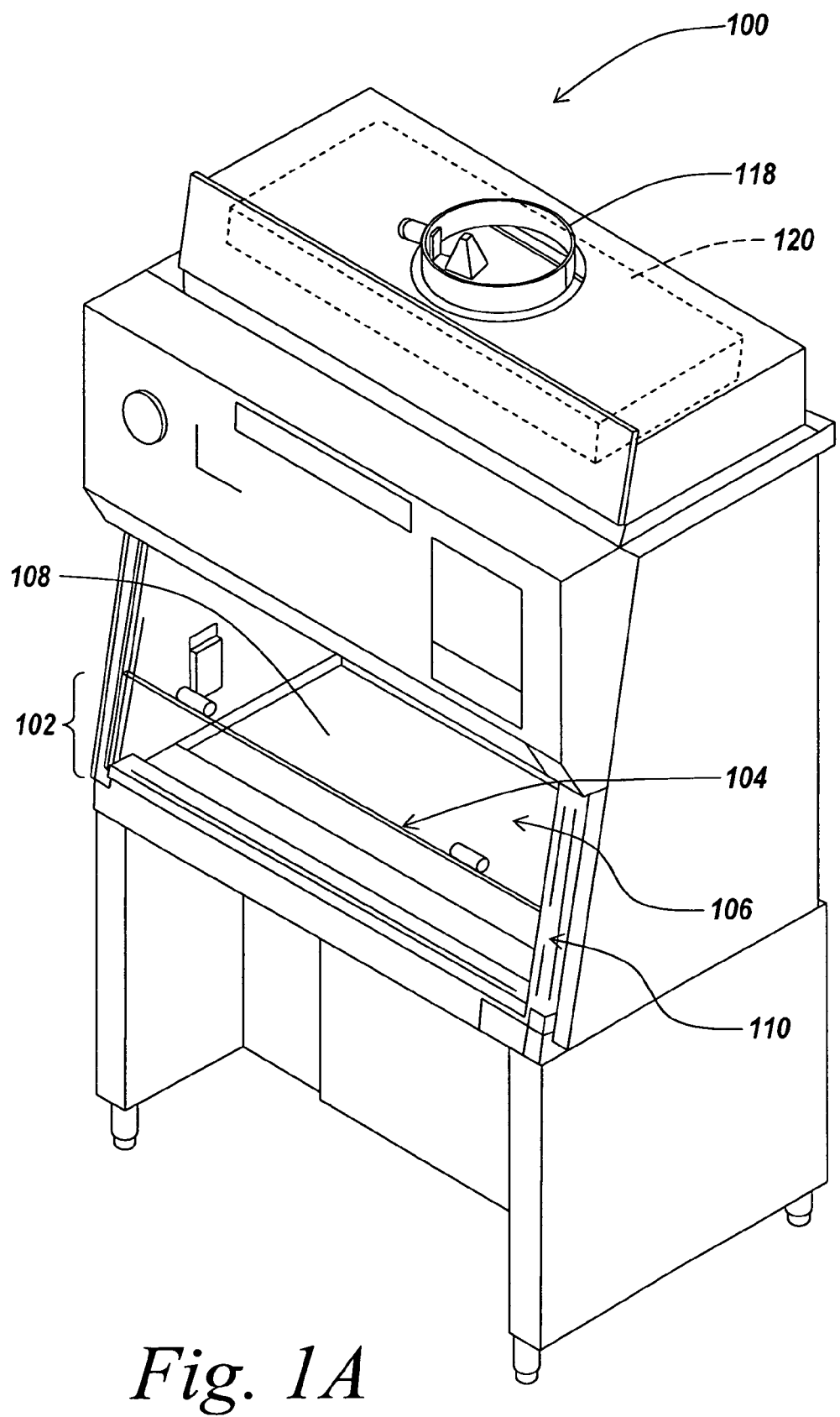
FIG. 1A is a perspective view of a biosafety cabinet, in accordance with one embodiment of the present invention.

An illustrative embodiment of the present invention relates to a biosafety cabinet having one or more air filters below the work surface and a system for holding, sealing, replacing and disposing the air filters through the work access opening of the biosafety cabinet. The purpose of having air filters under the work surface of a biosafety cabinet is to capture particulates entering the cabinet from the exterior environment and the particulates within the cabinet's work chamber before they can reach the blower. It is important to limit the spread of contaminated particulates within the cabinet while protecting the blower, the product being worked on in the work chamber, the personnel working at the cabinet and the environment. According to the illustrative embodiments of the present invention, the air filters may be accessed through the work access opening of the biosafety cabinet, packaged for disposal and removed from the biosafety cabinet without being exposed to the exterior environment. In other words, the configuration of the biosafety cabinet of the present invention allows accessing, handling, and packaging the used, contaminated air filters while they are still inside the area of the biosafety cabinet that can be exhausted. This ability reduces the likelihood of releasing contaminants resident on the filters into the exterior environment surrounding the biosafety cabinet, such as a lab or research facility, when the filters are unclamped or unsealed and removed from the cabinet.

Prior to discussing the details of the present invention, a brief overview of the different biosafety cabinets will be provided. A biological safety cabinet is designed to reduce the potential escape of airborne research or experimental materials and byproducts into the worker's environment and to remove contaminants from air entering the research work zone. A laminar flow biological safety cabinet is designed to provide three basic types of protection: personnel protection from harmful agents inside the cabinet, product protection to avoid contamination of the work, experiment or process, and environmental protection from contaminants contained within the cabinet. In addition, the cabinet will provide cross contamination protection in the work zone to prevent airborne particles from traveling from one side of the cabinet to the other side of the cabinet.

Over the years, the scientific community has adopted commonly accepted classification criteria to differentiate containment capabilities and performance attributes of biological safety cabinets. In general, biological safety cabinets are divided into 3 classifications as illustrated in Table 1.

TABLE 1

| Classification | Biosafety Level | Application |
| --- | --- | --- |
| Class I | 1, 2, 3 | low to moderate risk biological agents |
| Class II | 1, 2, 3 | low to moderate risk biological agents |
| Class III | 4 | high risk biological agents |

Biosafety Level 1 encompasses practices, safety equipment and facilities appropriate for work with defined and characterized strains of viable microorganisms not known to cause disease in healthy adult humans. Work is generally conducted on open bench tops using standard microbiological practices. For biosafety level 1, special containment equipment or facility design is neither required nor generally used.

Biosafety Level 2 encompasses practices, safety equipment and facilities appropriate for work done with a broad spectrum of indigenous moderate-risk agents present in the community and associated with human disease in varying severity. It differs from biosafety level 1 in that laboratory personnel have specific training in handling pathogenic agents and are directed by competent scientists; access to the laboratory is limited when work is being conducted; extreme precautions are taken with contaminated sharp items; and certain procedures in which infectious aerosols or splashes may be created are conducted in biosafety cabinets or other physical containment equipment. A Class I or Class II biosafety cabinet is recommended for work involving these agents.

Biosafety Level 3 encompasses practices, safety equipment and facilities appropriate for work done with indigenous or exotic agents with a potential for respiratory transmission which may cause serious and potentially lethal infection. More emphasis is placed on primary and secondary barriers to protect personnel in the contagious area, the community, and the environment from exposure to potentially infectious aerosols. A Class I or Class II biosafety cabinet is required for work involving these agents.

Biosafety Level 4 encompasses practices, safety equipment and facilities appropriate for work done with dangerous and exotic agents which pose a high risk of life threatening disease. Agents may be transmitted via the aerosol route, and for which there is no available vaccine or therapy. Access to the laboratory is strictly controlled by the laboratory director. The facility is either in a separate building or in a controlled area within a building, which is completely isolated from all other areas of the building. A Class III biosafety cabinet or pressurized environmental suits is required for work involving these agents.

The Class I cabinet has the most basic and rudimentary design of all biosafety cabinets. A stream of inward air moving into the cabinet contains aerosols generated during microbiological manipulations. It then passes through a filtration system that traps all airborne particles and contaminants. Finally, clean, filtered air is exhausted from the cabinet. The filtration system usually consists of a pre-filter and a HEPA (High Efficiency Particulate Air) filter.

Although the Class I cabinet protects the operator and the environment from exposure to biohazards, it does not prevent samples being handled in the cabinet from coming into contact with airborne contaminants that may be present in room air. Naturally, there is a possibility of cross-contamination that may affect experimental consistency. Class I biosafety cabinets are suitable for work with microbiological agents assigned to biological safety levels 1, 2 and 3.

Like Class I biosafety cabinets, Class II biosafety cabinets have a stream of inward air moving into the cabinet. This is known as the inflow and it prevents the aerosol generated during microbiological manipulations to escape through the front opening. However, unlike Class I cabinets, the inflow on Class II cabinets flows through the front inlet grille, near the operator. None of the unfiltered inflow air enters the work zone of the cabinet, so the product inside the work zone is not contaminated by the outside air.

A feature unique to Class II cabinets is a vertical laminar (unidirectional) HEPA-filtered air stream that descends downward from the interior of the cabinet. This continuously flushes the cabinet interior of airborne contaminants and protects samples being handled within the cabinet from contamination and is known as the down flow. Some cabinets may exhaust air directly back to the laboratory, while others may exhaust air through a dedicated ductwork system to the external environment.

Class II cabinets, like Class I cabinets, protect both the operator and environment from exposure to biohazards. In addition, Class II cabinets also protect product samples from contamination during microbiological manipulations within the cabinet interior and are all suitable for work with agents assigned to biological safety levels 1, 2 and 3. Class II cabinets are further classified according to how they exhaust air.

The Class II Type A biosafety cabinets exhaust air directly back to the laboratory, and they may contain positive pressure contaminated plenums. When toxic chemicals must be employed as an adjunct to microbiological processes, these cabinets are not used. Exhaust HEPA filtration only removes airborne aerosols including biohazards, and not chemical fumes.

A primary difference between a Class II type A and a type B cabinet is that the type B cabinet must be operated with an external blower and it exhausts air to the external environment via a dedicated ductwork system. Without the external blower, the cabinet's internal blower will blow the air (and microbiological agents) inside the work zone through the front operator, towards the operators face, creating a dangerous situation.

The Class II Type B1 biosafety cabinets have a dedicated exhaust feature that eliminates re-circulation when work is performed towards the back within the interior of the cabinet.

In the Class II Type B2 cabinet all inflow and down flow air is exhausted after HEPA filtration to the external environment without recirculation within the cabinet. Type B2 cabinets are suitable for work with toxic chemicals employed as an adjunct to microbiological processes under all circumstances since no re-circulation occurs.

The Class III biosafety cabinet provides an absolute level of safety, which cannot be attained with Class I and Class II cabinets. Class III cabinets are usually of welded metal construction and are designed to be gastight. Work is performed through glove ports in the front of the cabinet. During routine operation, negative pressure relative to the ambient environment is maintained within the cabinet. This provides an additional fail-safe mechanism in case physical containment is compromised.

On Class III cabinets, a supply of HEPA filtered air provides product protection and prevents cross contamination of samples. Double HEPA filtered exhaust air may be incinerated. Class III cabinets exhaust air via a dedicated ductwork system to the external environment. When a dedicated ductwork system is employed, they are also suitable for work employing toxic chemicals as an adjunct to microbiological processes. Class III biosafety cabinets are frequently specified for work involving the most lethal biological hazards.

Now turning to the present invention, FIGS. 1A through 6B, wherein like parts are designated by like reference numerals throughout, illustrate an exemplary embodiment of a biosafety cabinet with one or more air filter disposed below the work surface, in accordance with the present invention. Although the present invention will be described with reference to the example embodiment illustrated in the figures, it should be understood that many alternative forms can embody the present invention. One of ordinary skill in the art will additionally appreciate different ways to alter the parameters of the embodiment disclosed, such as the size, shape, or type of elements or materials, in a manner to conform with the spirit and scope of the present invention. The biosafety cabinet described herein is not intended solely for use in Class II, Type B1 cabinets as illustrated but can also be used in any type of Class II biosafety cabinets. The biosafety cabinet described herein may also have applicability for situations in which containment of toxic or biohazard materials is desirable in ventilation systems and containment devices other than Class II biosafety cabinets.

Figure 1B:
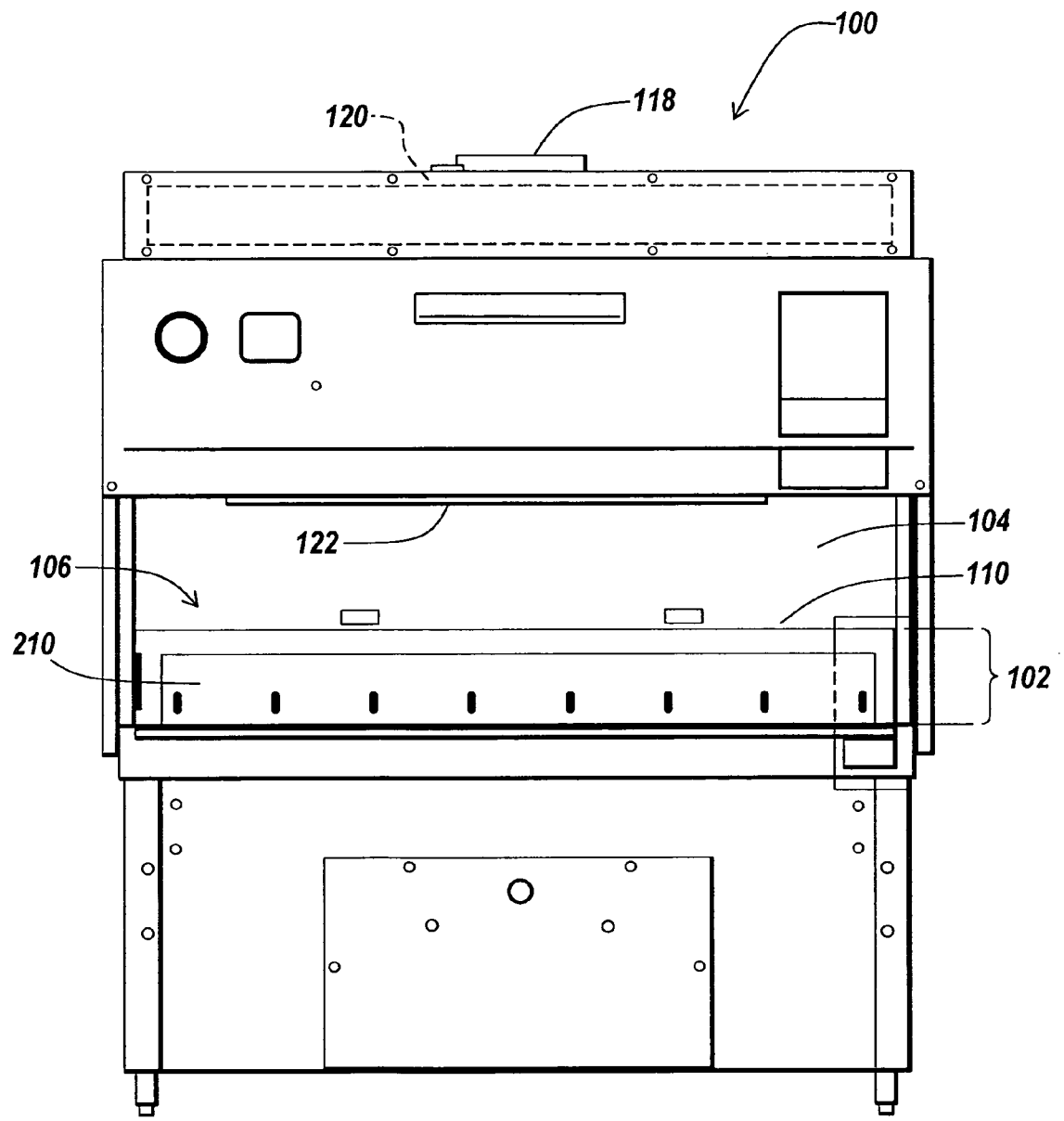
FIG. 1B is a front view of a biosafety cabinet, in accordance with one embodiment of the present invention.
Figure 1C:
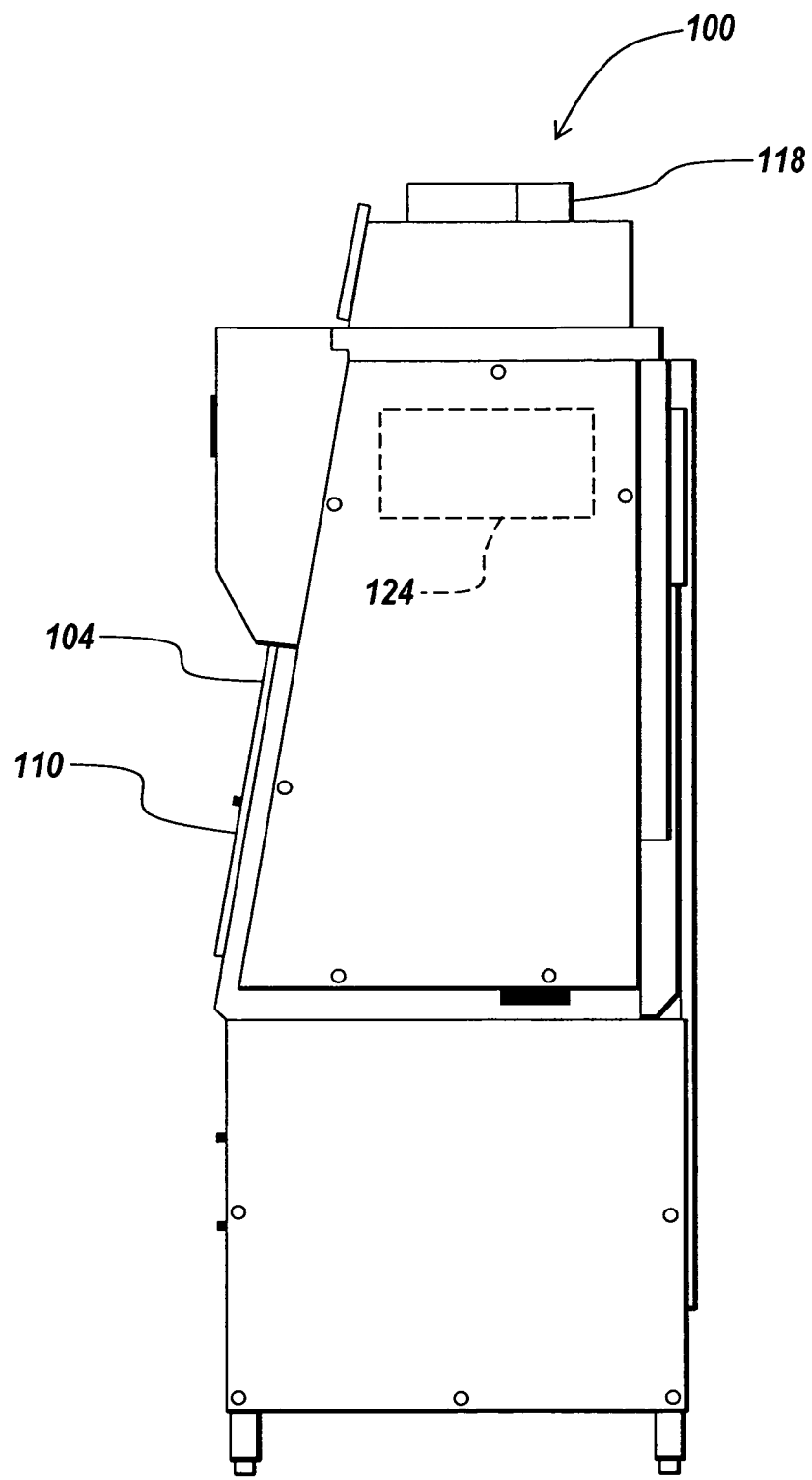
FIG. 1C is a side view of a biosafety cabinet, in accordance with one embodiment of the present invention.

FIGS. 1A-1C illustrate a biosafety cabinet 100 in accordance with one embodiment of the present invention. The biosafety cabinet 100 has a view screen 104 and a work access opening 102 provided below the view screen 104. According to requirements of specific embodiments, the view screen 104 may be a sliding view screen. A door 110 is provided in the view screen 104 area and may itself be a sliding view screen or may be a component of or within the view screen. When the door 110 is open, the user gains physical access to a work chamber 106 through the work access opening 102. The work chamber 106 has a removable bottom tray forming a removable work surface 108. One or more air filters 114, such as HEPA filters, are provided below the work surface 108 and are accessible through the work access opening 102. The work chamber 106 also has removable rear wall perforation 210.

The biosafety cabinet 100 has an optional germicidal light source 122. The germicidal light source 122 generates germicidal light when the door 110 is closed. The generation of germicidal light may be automatically interrupted when the door 110 is opened. The germicidal light source 122 is illustrated on the upper side of the work chamber 106. However, it may also be provided on other locations based on the particular use and configuration of the biosafety cabinet 100. The biosafety cabinet 100 further includes an exhaust system 118 to exhaust the contaminated air outside of the biosafety cabinet 100. The exhaust system 118 may include an exhaust filter 120. The biosafety cabinet 100 may also have a supply filter 124 to filter the air entering the work chamber 106. The position of the exhaust filter 120 and the supply filter 124 may be modified according to the specific use and configuration of the biosafety cabinet 100. HEPA filters may be used for both exhaust filter 120 and supply filter 124.

Figure 2A:
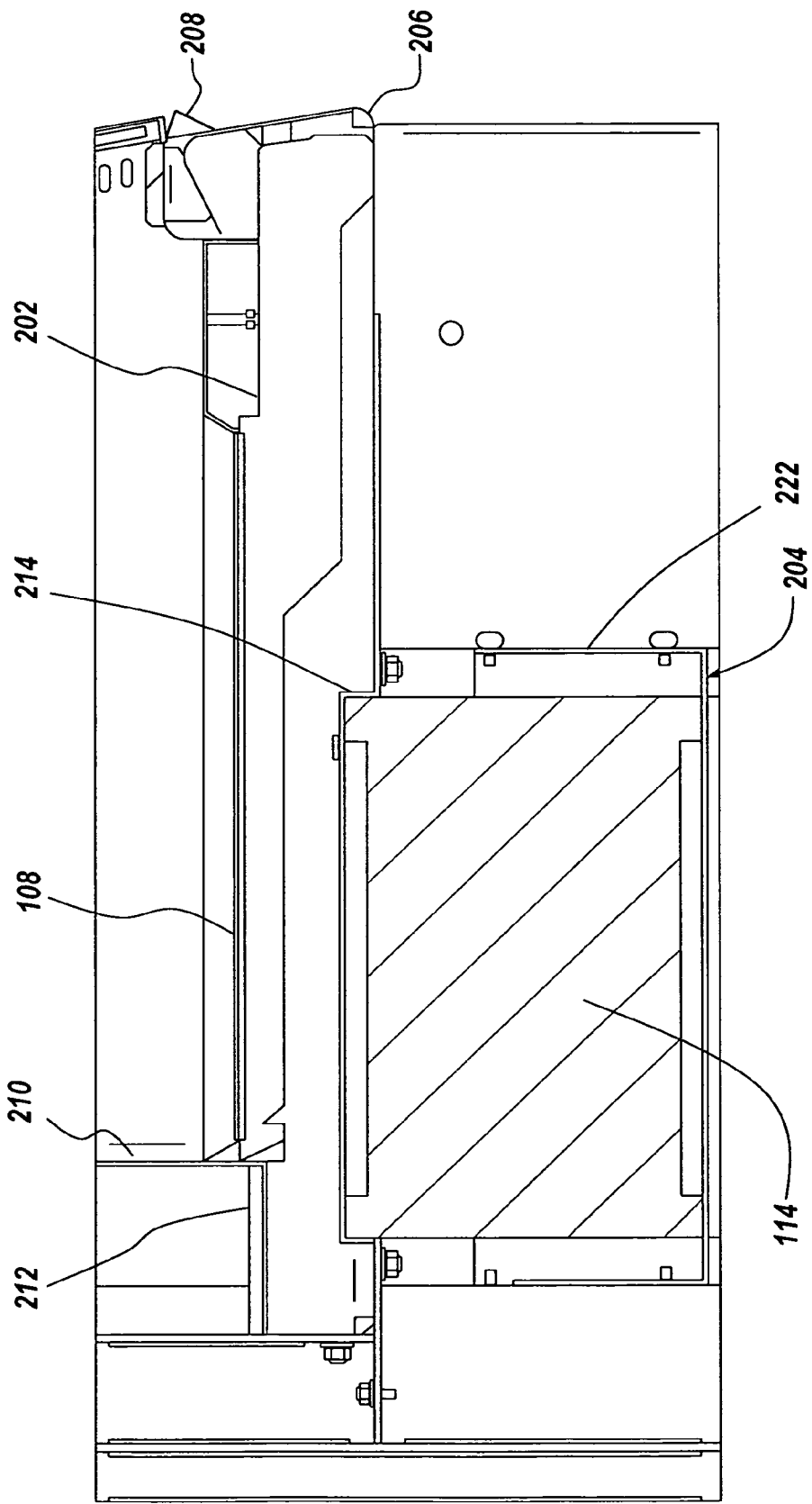
FIG. 2A is a close-up cutaway view of the air filter below the work surface of the biosafety cabinet.

FIG. 2A illustrates a close up side view of the work surface 108 and the air filter 114 below the removable work surface 108. The air filter 114 removes contaminated particulates from the air in the work chamber 106 of the biosafety cabinet 100 and particulates from the air entering the biosafety cabinet 100 through the work access opening 102. The particulates are drawn under the work surface 108.

Figure 2B:
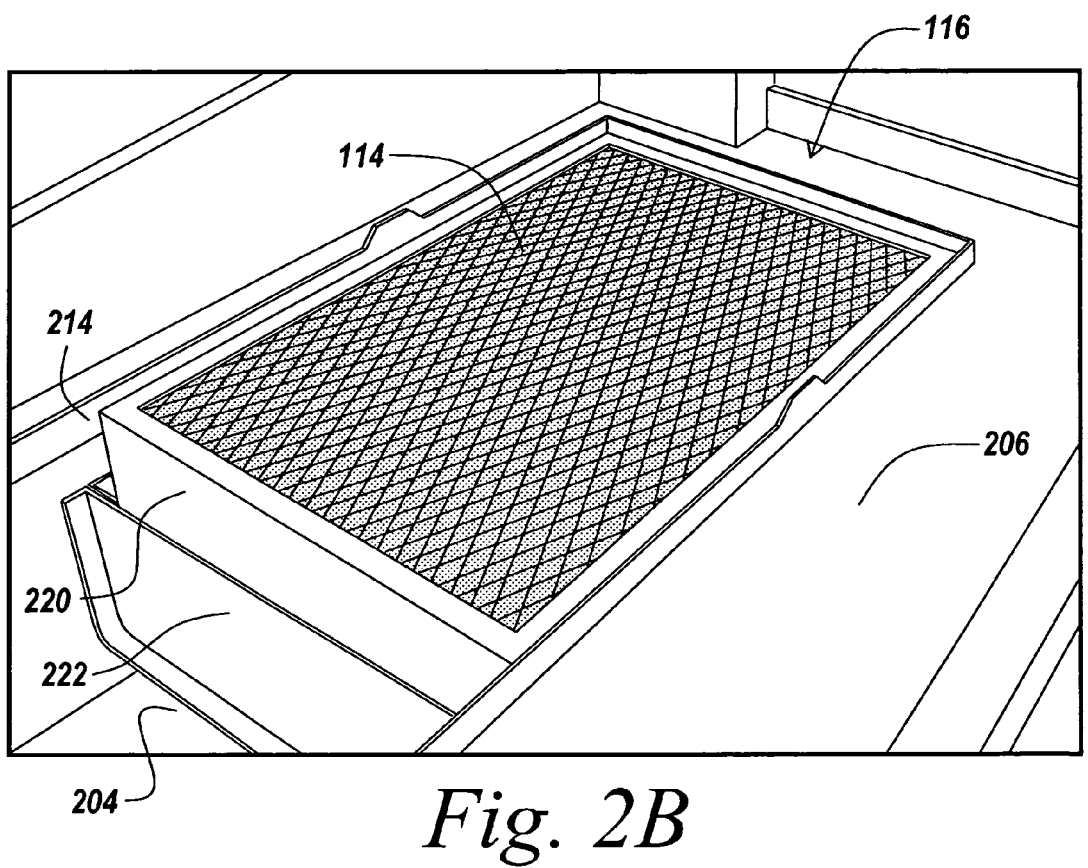
FIG. 2B illustrates another close up views of the air filter below the work surface of the biosafety cabinet.

FIG. 2B illustrate additional close up view of the air filter 114 below the work surface 108. As illustrated in FIG. 2B, the air filter 114 is located inside an air filter housing 204, behind a drain pan 206 of the biosafety cabinet 100. The drain pan 206 may be made of a stainless steel sheet metal. A rectangular air filter housing 204 with an upward bent flange 214 around its perimeter may be provided adjacent to the drain pan 206. According to an exemplary embodiment of the present invention, the air filter 114 may have extruded anodized aluminum alloy filter frames 220.

The air filter housing 204 runs along most of the length of the drain pan 206 and is positioned behind the rear of the drain pan 206 to create knee space for a person seated at the biosafety cabinet 100. The air filter housing 204 provides a place to set the air filters 114 under the work surface 108.

Figure 3:
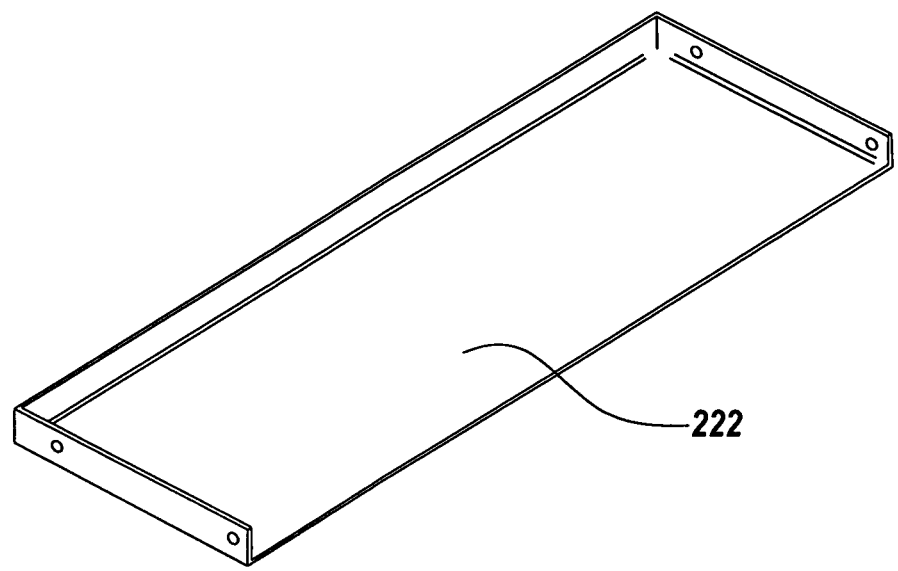
FIG. 3 is a perspective view of the air filter housing.

FIG. 3 illustrates a filter housing support bracket 222 that may be mounted in the air filter housing 204. The filter housing support bracket 222 keeps the air filter 114 in place. In accordance with one example embodiment, each air filter 114 may be 13" wide and 8" deep but may not be longer than 33" long to be able to fit into a standard 55 gallon hazardous material disposal container.

The flange 214 surrounding the perimeter of the air filter housing 204 provides a surface for the sealing material 230 and creates a cleanable exterior. Removable components, such as the removable air baffle 212, removable rear wall perforation 210, removable work surface supports 202, and removable air bypass armrest 208 within the work chamber 106 allow access to the air filter 114. As such, used or damaged air filters 114 can be safely accessed, capped and removed from the biosafety cabinet 100, bagged inside the work chamber 106 and placed in a hazardous waste container for disposal.

Figure 4A:
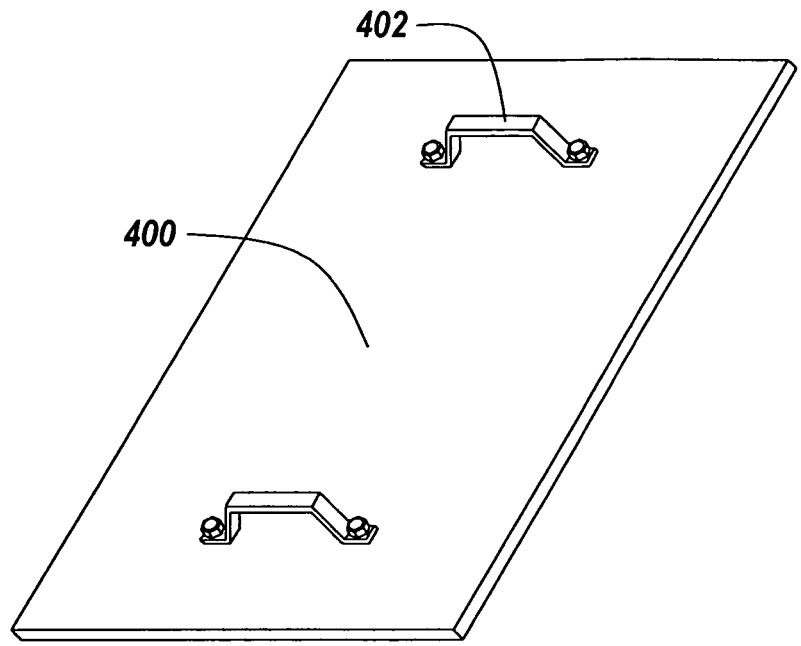
FIG. 4A is a perspective view of the cover with handles.
Figure 4B:
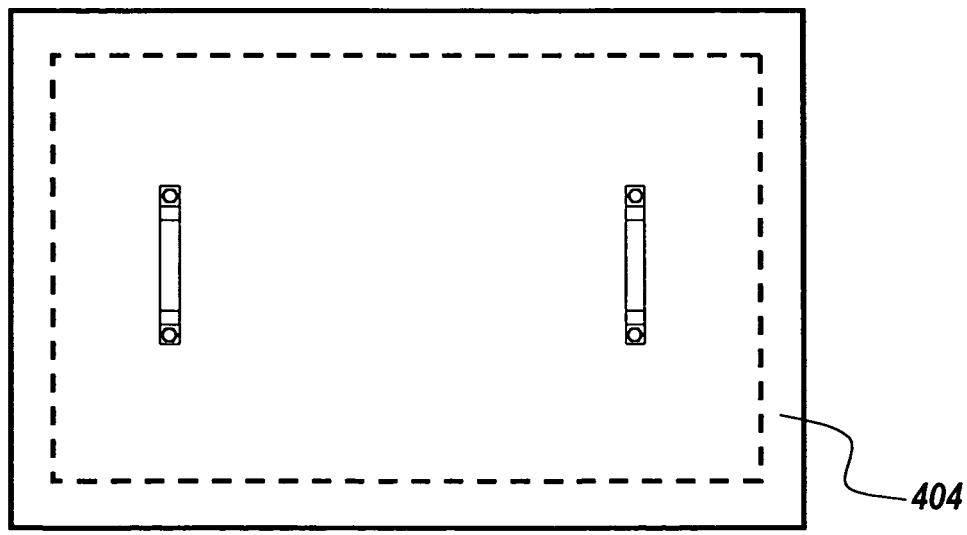
FIG. 4B is a perspective view of the cover with the adhesive surface.

FIGS. 4A-4B illustrate a special cover 400 with handles 402 that can be used to cap and lift an air filter 114. The cover 400 has an adhesive surface 404 that faces the side of the air filter 114 that meets with exhaust air first (i.e., the upstream side) and which therefore collects more of the particulates being removed from the air. Once the adhesive surface 404 attaches to the air filter 114, the cover 400 is lifted with the air filter 114 being attached to the cover 400, and removed through the work access opening 102.

A method of removing an air filter 114 under the work surface 108 through the work access opening 102 is described below with respect to FIGS. 5A-5D.

Figure 5A:
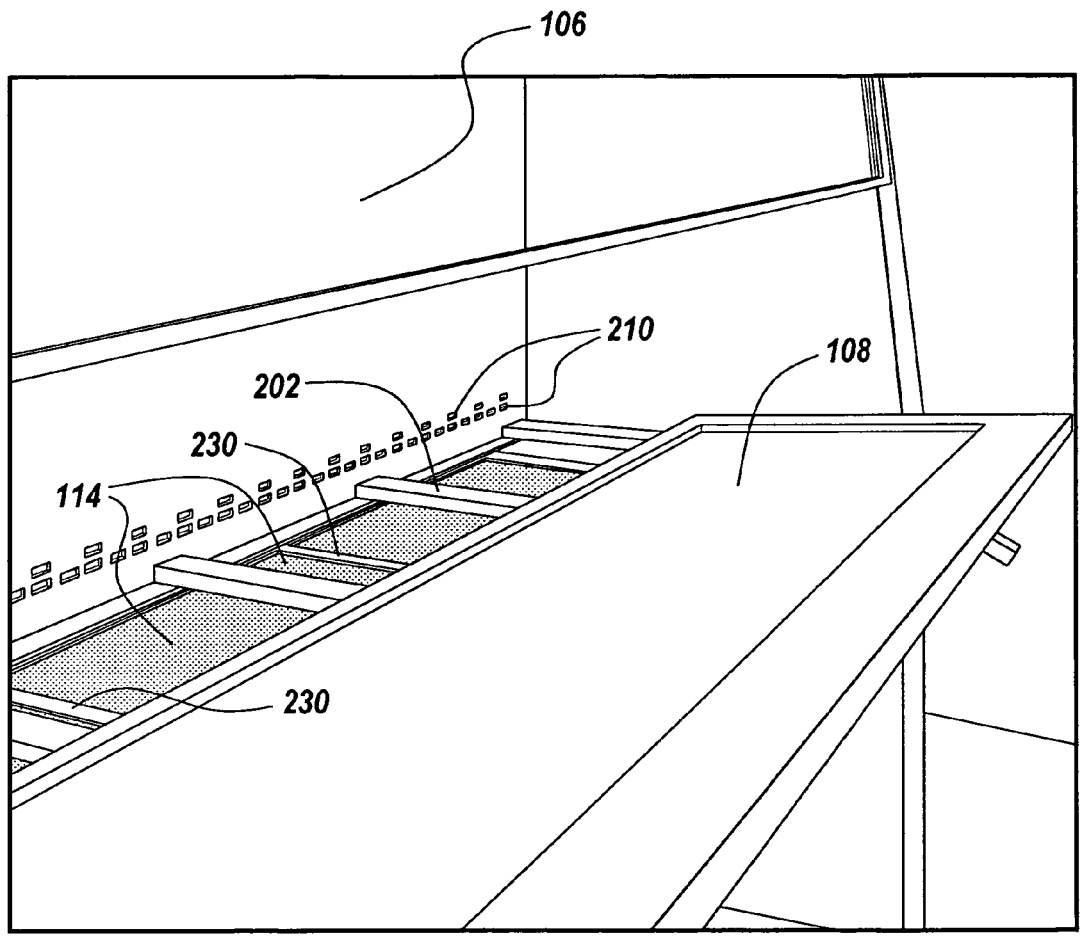
FIGS. 5A-5D illustrate a method of removing an air filter under the work surface through the work access opening of a biosafety cabinet.

To reduce the likelihood that contaminants could escape during the changing of a filter, a blower 508 and the exhaust system 118 can continue to run during changing of the air filter 114. The first step is to decontaminate the work chamber 106. After decontamination, as illustrated in FIG. 5A, the work surface 108, the work surface supports 202, the rear wall perforation 210, the air baffle 212 and the bypass armrest 208 can be removed. The filters 114 are fully exposed.

Figure 5B:
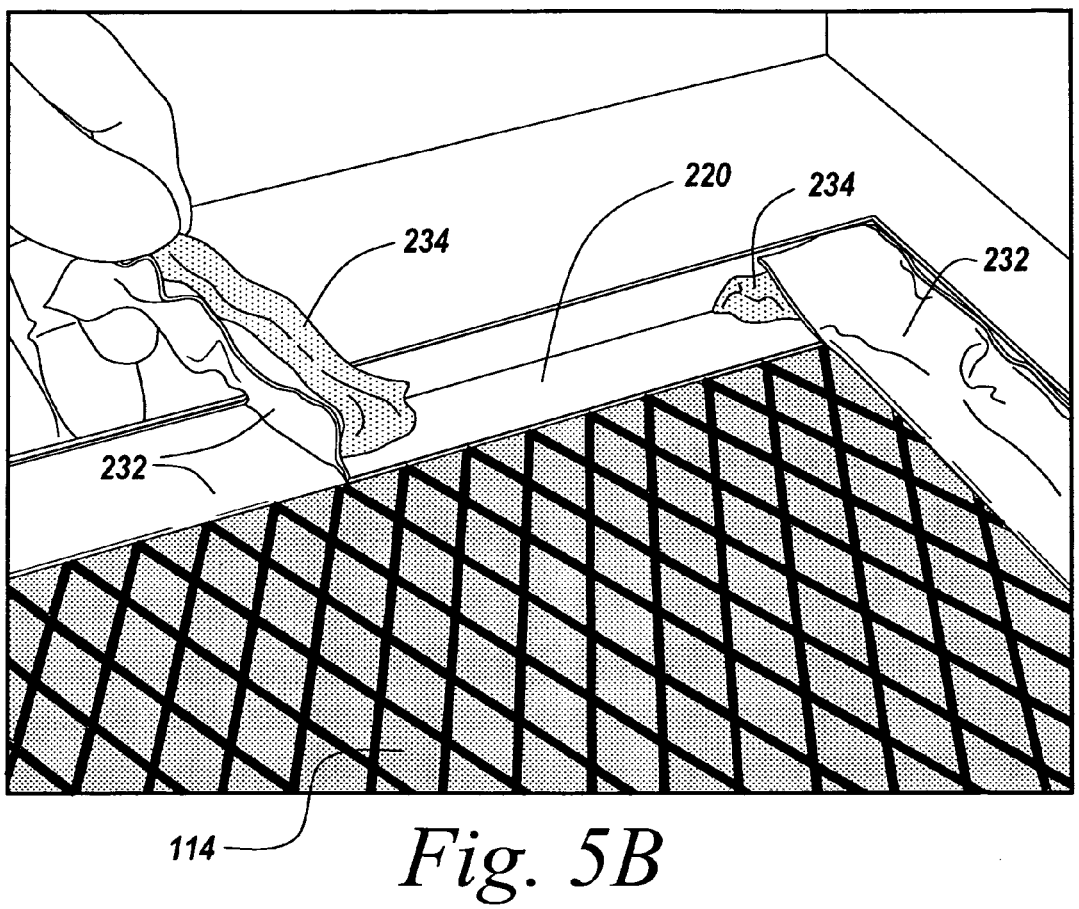

FIG. 5B illustrates the removal of the sealing material 230. In accordance with one example embodiment, the sealing material 230 is formed of a tape 232 and a gasket 234 sealing the air filter 114 to the air filter housing 204, resulting in a non-clamped sealing mechanism. Use of a non-clamped sealing mechanism eliminates the possibility of the clamp that holds the filter in place itself being contaminated, and removes the problem of a clamp not being easy to clean or decontaminate. With the completely removable non-clamped sealing mechanism of the present invention, the entire mechanism holding and sealing the filter in place is removed with each filter change. A tool, such as a knife, may be used to cut the gasket 234 near the tape 232 pull point. In practice, when the tape 232 is pulled, the gasket 234 most often stays on the tape 232. However, pulling the tape 232 too fast can result in the tape 232 breaking or the gasket 234 staying on the filter frame 220. The tape 232 and the gasket 234 are removed completely from the perimeter of the air filter 114. A disposable plastic scraper may be used to remove any gasket 234 material not pulled up with the tape 232.

Figure 5C:
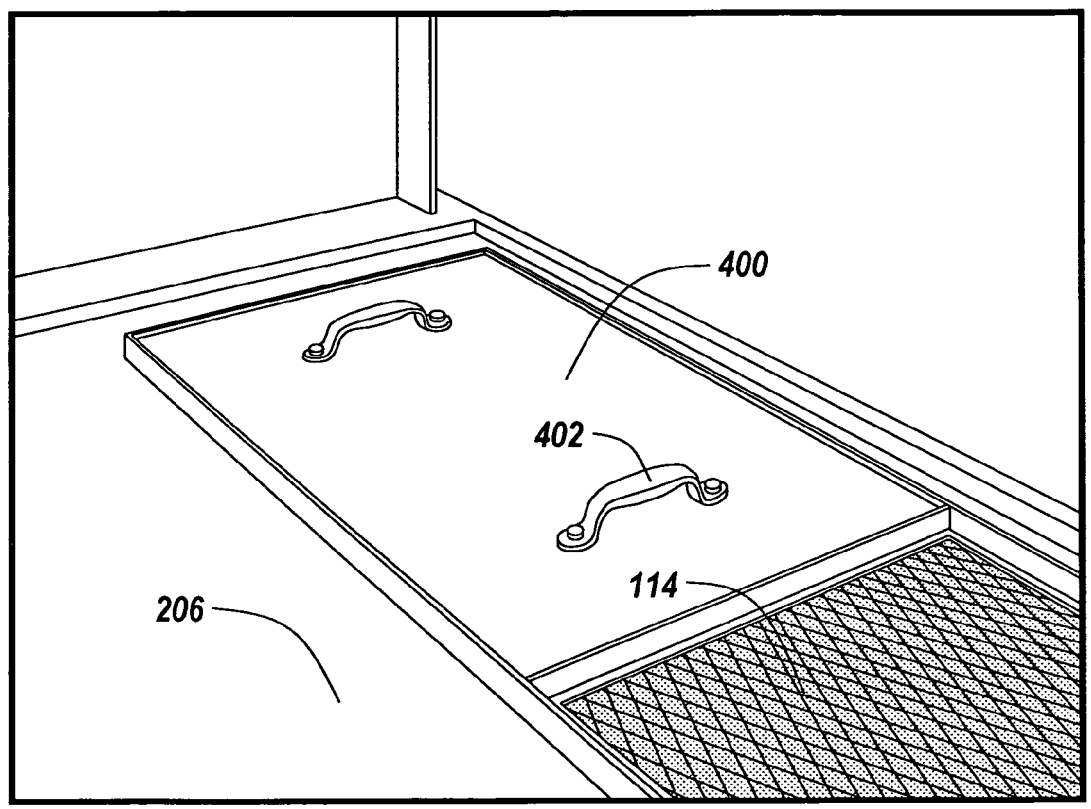

As illustrated in FIG. 5C, the cover 400 with handles 402 can be used in removing the air filter 114. The paper adhesive wrapping around the surface of the cover 400 is removed, exposing an adhesive surface of the cover 400. The adhesive surface is then placed over the top of the used air filter 114 sealing the dirty surface of the air filter 114. The air filter 114 is lifted with the cover 400, using the handles 402 of the cover 400.

Figure 5D:
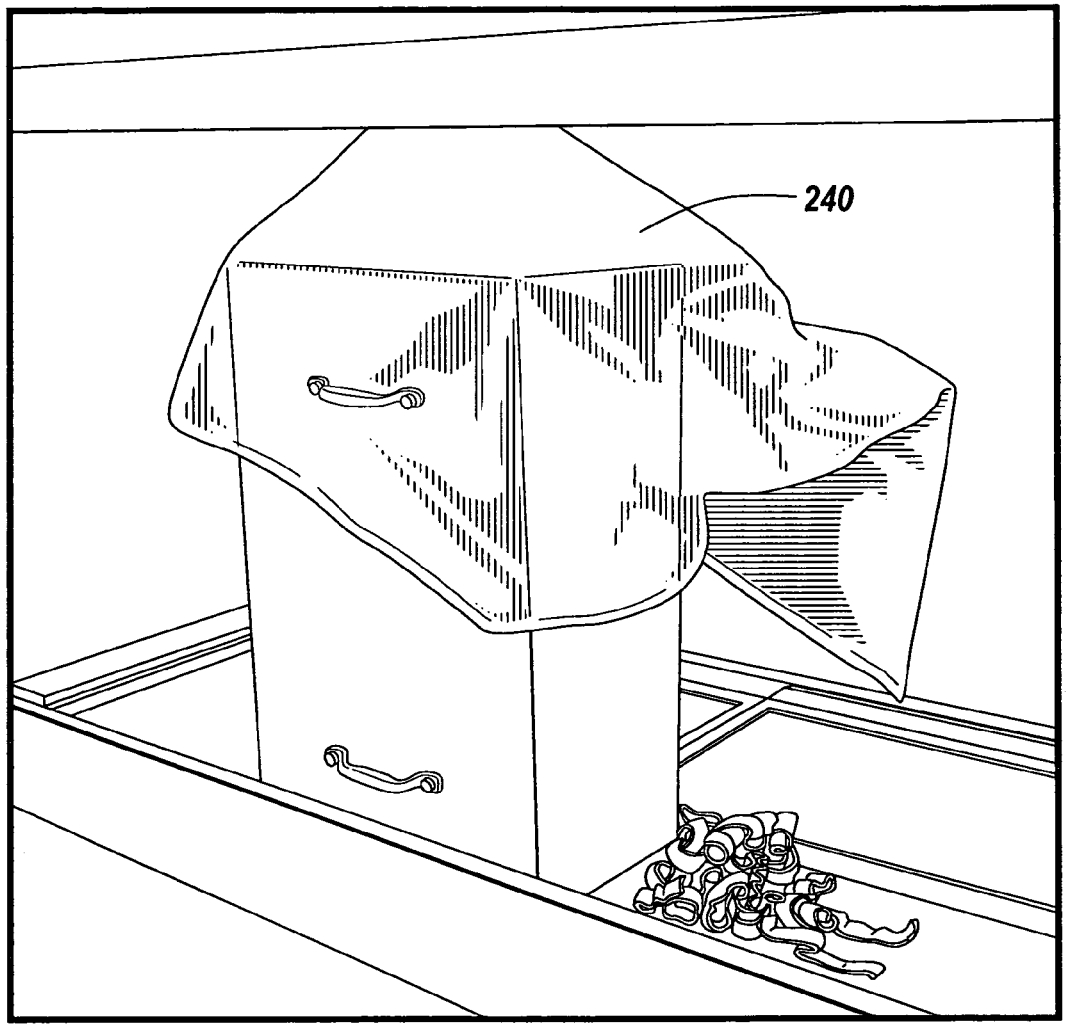

FIG. 5D illustrates the air filter 114, removed from its location, being bagged in a hazardous material container 240 along with the removed tape 232 and gasket 234 for disposal. The removal steps illustrated in FIGS. 5A-5D are repeated for each used air filter 114.

Figure 5E:
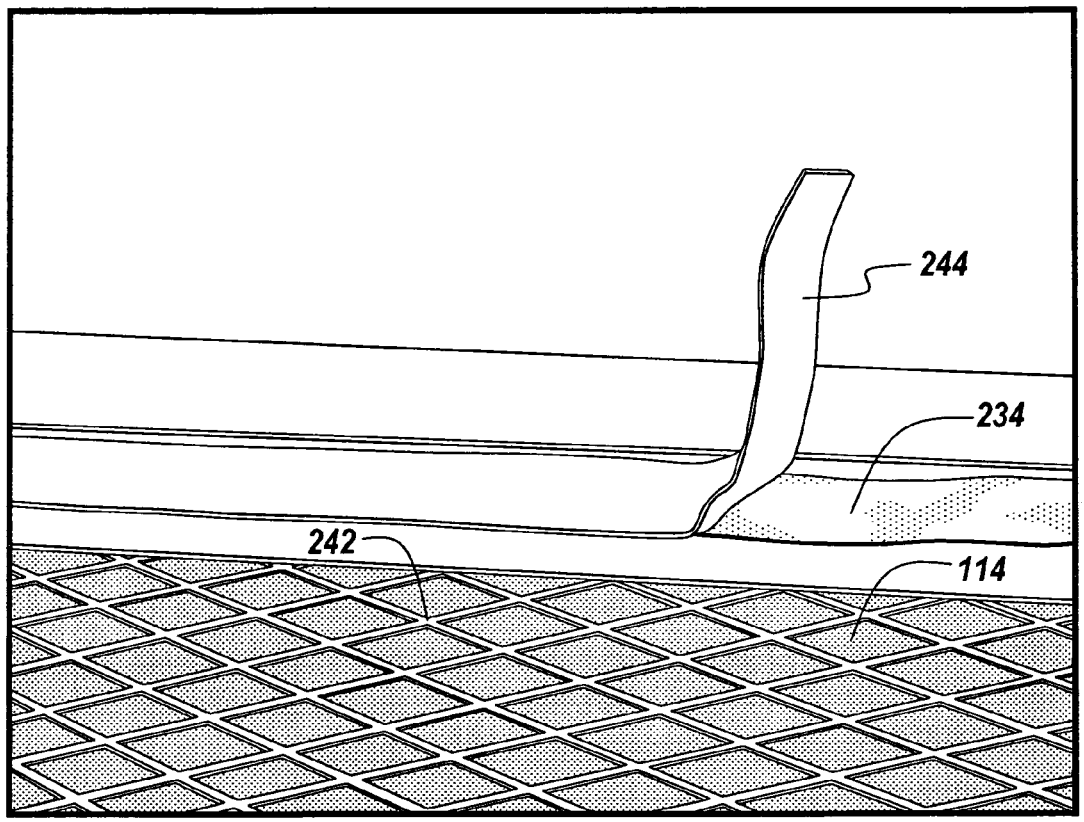
FIGS. 5E-5G illustrate a method of placing an air filter under the work surface through the work access opening of a biosafety cabinet.
Figure 5F:
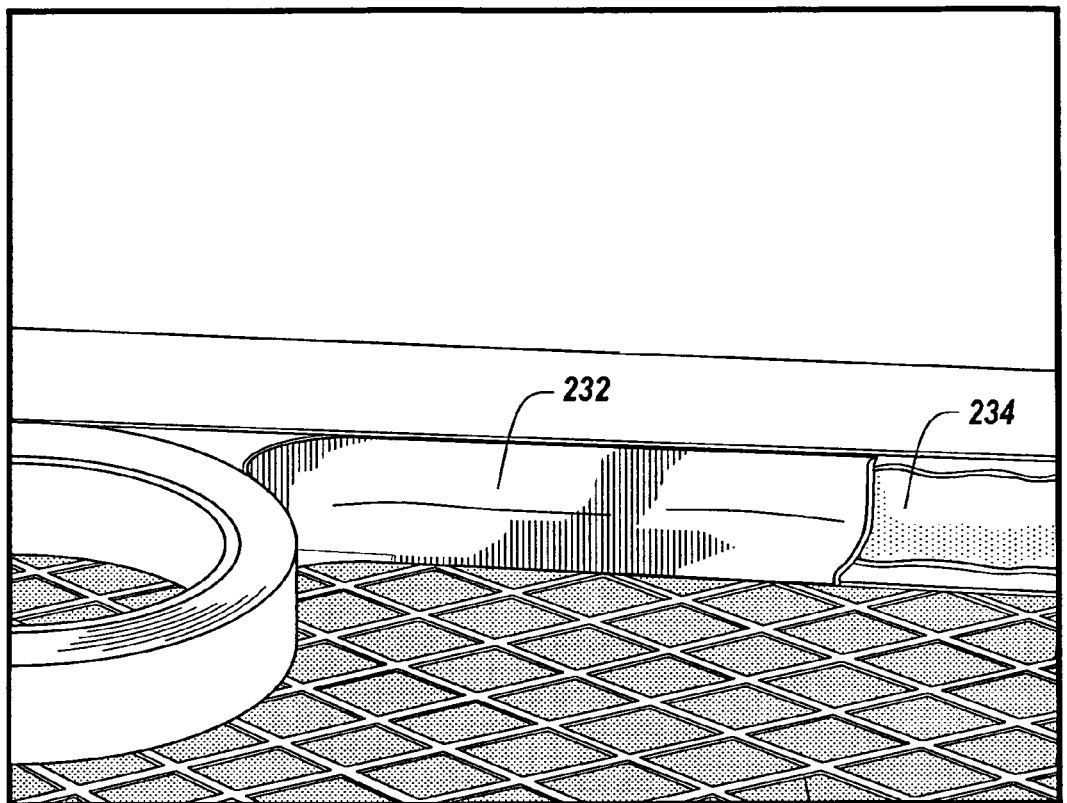

A method of placing an air filter 114 under the work surface 108 through the work access opening 102 is provided below with respect to FIGS. 5E-5G.

After removing the air filters 114, the upward bent flanges 214 are cleaned to ensure that all tape 232 and gasket 234 material has been removed. New air filters 114 are placed in the air filter housing 204 in a manner such that they seat properly on the filter housing support brackets 222 with the filter media protective screen 242 facing upward. New gasket 234 is applied around the air filter 144 perimeter in the center of the seam formed by the air filter 114 and the air filter housing 204. When the gasket 234 is pressed firmly in place, the paper backing 244 on the gasket 234 may be removed, as shown in FIG. 5E. Using the rounded handle of a putty knife as a tool, the gasket 234 is firmly pressed in place. The gasket 234 slightly overlaps where the ends come together and is pressed in place. Any excess gasket 234 material may be trimmed with scissors. An additional layer of gasket 234 can be applied at the corners of the air filter housing 204. Air filters 114 and the gasket 234 should then be checked for leaks. FIG. 5F illustrates a tape 232 being applied over the gasket 234 to protect the gasket 234 and create a cleanable surface. One strip of tape 232 is used along the perimeter of the air filter 114 and two strips of tape 232 overlap between the air filters 114.

Figure 5G:
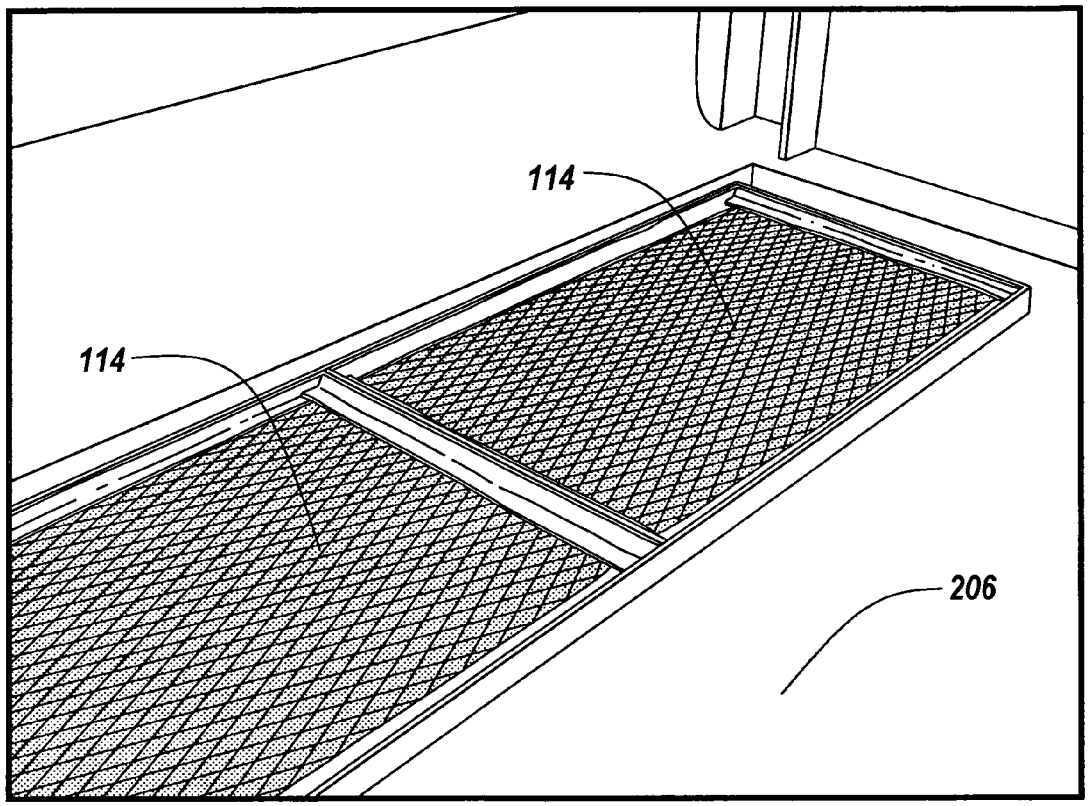

FIG. 5G illustrates a completed installation of the air filters 114 inside the air filter housing 204, through the work access opening 102 of the biosafety cabinet 100. Following is a description of the air flow inside of the biosafety cabinet 100 with air filters 114 below the work surface 108.

Figure 6A:
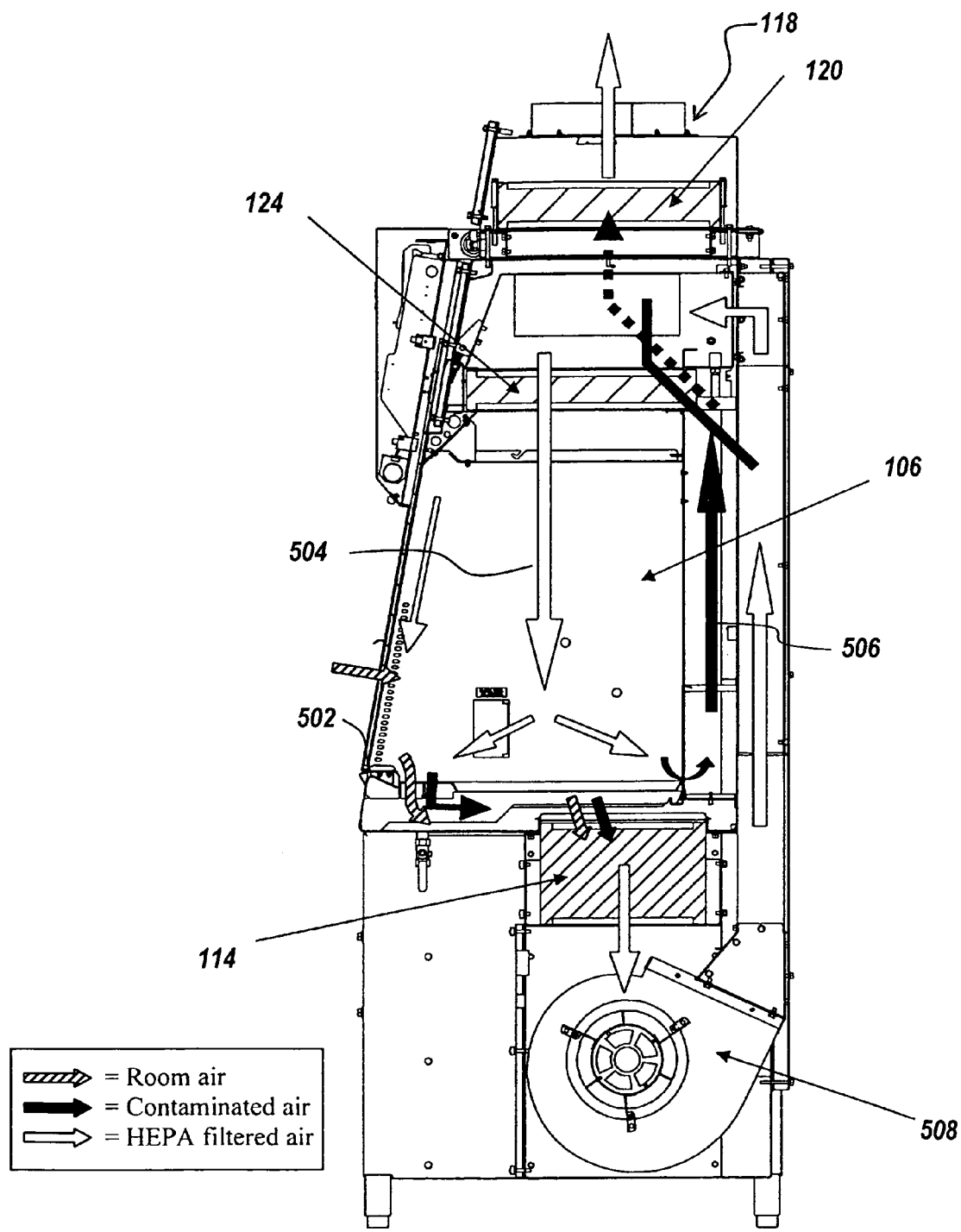
FIG. 6A is a side cutaway view of the biosafety cabinet illustrating the airflow inside of the biosafety cabinet.
Figure 6B:
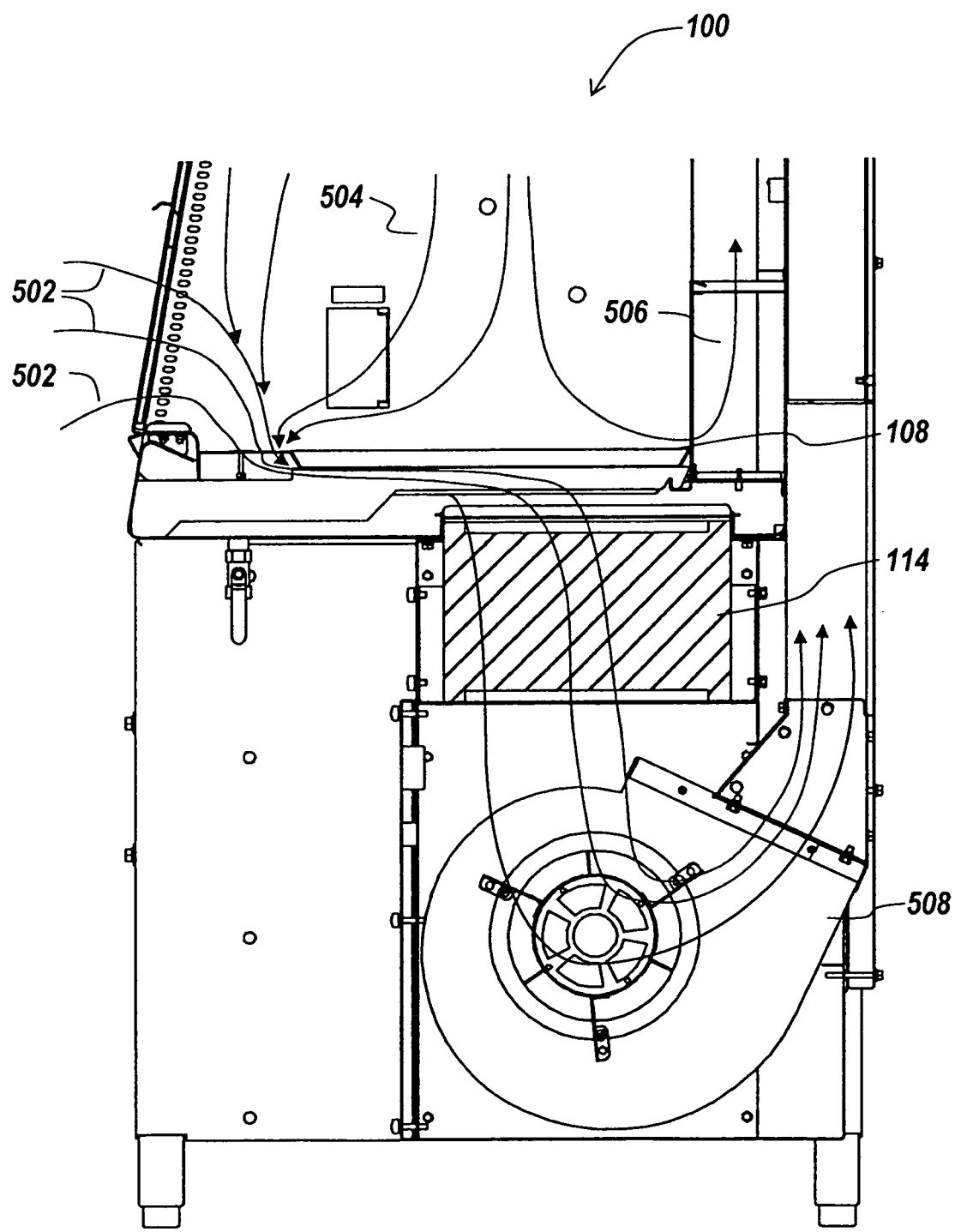
FIG. 6B is a close-up cutaway view of the bottom of the biosafety cabinet including a blower illustrating the airflow inside of the biosafety cabinet.

FIGS. 6A-6B illustrate inlet airflow streams 502. As illustrated in FIG. 6A, the inlet airflow streams 502 enter the work chamber 106 through the work access opening 102 and travel below the work surface 108. More specifically, FIG. 6B is a close-up cutaway view of the bottom of the biosafety cabinet including a blower 508 that illustrates airflow streams inside the biosafety cabinet 100. The inlet airflow streams 502 enter though the work access opening 102 when the door 110 is open. The inlet airflow streams 502 travel below the work surface 108 along with the contaminated air 506 from inside of the work chamber 106. The inlet airflow streams 502 and the contaminated air 506 move toward the down flow air filter 114 located below the work surface 108 and toward the blower 508. The down flow air filter 114 may be a High Efficiency Particulate Arresting (HEPA) filter. Some of the contaminated air 506 from inside of the work chamber 106 is directed toward the exhaust system 118 of the biosafety cabinet 100. The exhaust system 118 may include a HEPA exhaust filter 120. After passing through the down flow air filter 114, the inlet airflow streams 502 and formerly contaminated air 506 form clean, filtered air 504 that is blown toward the ceiling of the biosafety cabinet 100 using a blower 508. Upon reaching the ceiling, the filtered air 504 may alternatively travel through a supply filter 124 before entering the work chamber 106.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved.

What is claimed is:

1. A biological safety cabinet, comprising:
   a housing formed of a plurality of walls defining a workspace chamber having an internal environment therein;
   a work surface forming a bottom of the workspace chamber;
   a door disposed on one wall of the housing having an open position and a closed position, and configured to provide a work access opening providing physical access to the workspace chamber and the work surface when the door is in the open position and obstructing the work access opening when the door in the closed position;
   an air exhaust passage exiting from the workspace chamber at the work surface providing a pathway for air drawn by a blower through the workspace chamber and out of the workspace chamber;
   at least one air filter disposed below the work surface, across the air exhaust passage, and adapted to filter air exiting from the workspace chamber through the air exhaust passage, the at least one air filter being sealed to the biological safety cabinet using a removable seal and being removable and replaceable through the work access opening of the workspace chamber;
   a drain pan provided below the workspace chamber, wherein the at least one air filter is positioned at a rear end of the drain pan, extending through a length of the drain pan; and
   wherein the biological safety cabinet is configured in such a way that the blower can remain operational and positioned to draw air through the workspace chamber and out of the workspace chamber while the at least one air filter is removable and replaceable through the work access opening.

2. The biological safety cabinet of claim 1, further comprising a removable non-clamped seal disposed about a perimeter of the at least one air filter sealing the filter against the biological safety cabinet to prevent airflow from passing around the filter.

3. The biological safety cabinet of claim 2, wherein the removable non-clamped seal is fixed to the biological safety cabinet using: a gasket material applied to the perimeter of the at least one air filter; and an adhesive tape applied on the gasket material, wherein the adhesive tape prevents particulates in the air from attaching to the gasket material.

4. The biological safety cabinet of claim 1, wherein the at least one air filter has dimensions no greater than 33 inches enabling the at least one air filter to fit within a standard 55 gallon hazardous material disposal container.

5. The biological safety cabinet of claim 1, further comprising an air filter housing for each air filter of the at least one air filter, the air filter housing having an upward bent flange around a perimeter of the air filter housing.

6. The biological safety cabinet of claim 5, further comprising: a plurality of air filter support brackets provided below each air filter housing.

7. The biological safety cabinet of claim 5, wherein the air filter housing is stainless steel.

8. The biological safety cabinet of claim 1, further comprising: an exhaust system coupled with the biological safety cabinet, the exhaust system exhausting air from inside of the biological safety cabinet to an external environment; and an exhaust air filter, provided in the exhaust system, the exhaust air filter filtering air contaminated inside of the workspace chamber.

9. The biological safety cabinet of claim 1, wherein the at least one air filter has extruded anodized aluminum alloy frames.

10. A method of placing an air filter in a biological safety cabinet, the method comprising:
   providing the biological safety cabinet with a door, a work access opening providing physical access to a workspace chamber of the biological safety cabinet, a drain pan provided below the workspace chamber, the biological safety cabinet comprising an air exhaust passage exiting from the workspace chamber at a work surface forming a bottom of the workspace chamber and providing a pathway for air drawn by a blower through the workspace chamber and out of the workspace chamber and at least one air filter housing below the workspace chamber, wherein the at least one air filter sealed into the at least one air filter housing with a removable seal and the at least one air filter is positioned at a rear end of the drain pan, extending through a length of the drain pan;

accessing the workspace chamber through the work access opening;

removing the work surface provided at a bottom of the workspace chamber;

removing the removable seal;

passing the air filter through the work access opening;

mounting the air filter below the work surface in the at least one air filter housing and across the air exhaust passage; and wherein the biological safety cabinet is configured in such a way that the blower can remain operational and positioned to draw air through the workspace chamber and out of the workspace chamber while the at least one air filter is removable and replaceable through the work access opening.

11. The method of claim 10, wherein mounting the air filter comprises:

placing the air filter in the at least one air filter housing, a protective screen of the air filter facing the workspace chamber;

applying a gasket material around a perimeter of the air filter; and applying an adhesive tape around the perimeter of the air filter, the adhesive tape covering the gasket material to form the removable seal.

12. The method of claim 11, further comprising: overlapping the gasket material at corners on a perimeter of the air filter.

13. The method of claim 11 further comprising: applying extra coat of the gasket material at corners on a perimeter of the air filter.

* * * * *